No. 761,497. PATENTED MAY 31, 1904.
O. & F. KAMPFE.
COVER FOR VESSELS.
APPLICATION FILED JUNE 19, 1903.
NO MODEL.
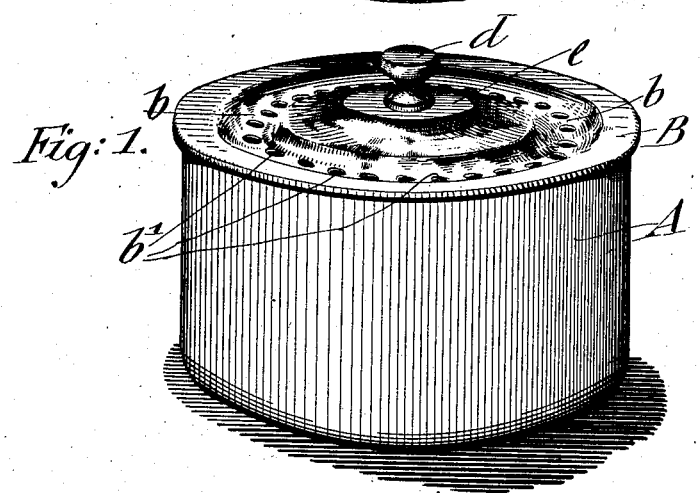
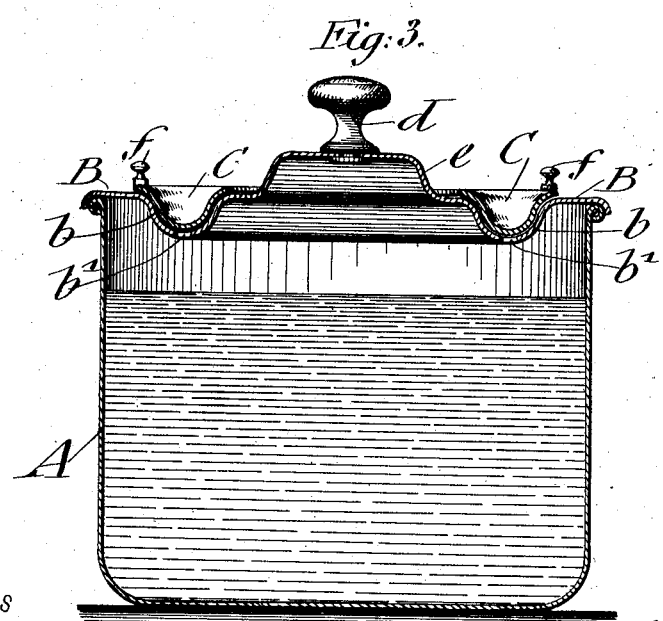
WITNESSES
C. P. Goepel.
John J. Kittler
INVENTORS
Otto Kampfe
Frederick Kampfe
BY Grace Niles
their ATTORNEYS No. 761,497.

Patented May 31, 1904.

UNITED STATES PATENT OFFICE.

OTTO KAMPFE AND FREDERICK KAMPFE, OF NEW YORK, N. Y.

COVER FOR VESSELS.

SPECIFICATION forming part of Letters Patent No. 761,497, dated May 31, 1904.

Application filed June 19, 1903. Serial No. 162,235. (No model.)

*To all whom it may concern:*

Be it known that we, OTTO KAMPFE and FREDERICK KAMPFE, citizens of the United States, residing in New York, borough of Brooklyn, and State of New York, have invented certain new and useful Improvements in Covers for Vessels, of which the following is a specification.

This invention relates to an improved cover for vessels which is so constructed that the boiling over of milk or other liquids onto the cooking-stove is effectually prevented, so that the annoyance caused by such running over of the liquids and the danger to the top plate of the cooking stove or range is entirely obviated; and for this purpose the invention consists of a cover for vessels provided with an annular depression having perforations in the lowermost portion of the same and a removable ring, the cross-section of which corresponds approximately with the cross-section of the annular depression and seated in said depression, as will be described more fully hereinafter and finally pointed out in the claims.

In the accompanying drawings, Figure 1 represents a perspective view of a vessel with our improved cover placed thereon. Fig. 2 is a perspective view of a detachable ring adapted to fit in the depression of the cover, and Fig. 3 is a vertical central section of a vessel with our improved cover and ring in position thereon.

Similar letters of reference indicate corresponding parts.

Referring to the drawings, A represents a vessel, and B the cover for the same. The vessel may be of any desired shape or configuration, the cover being made to correspond to the contour of the top of the same. The cover B is provided with an annular depression $b$, which is provided in its lowermost portion with a number of perforations $b'$. The central part $e$ of the cover B is preferably raised and provided with a knob or handle $d$, that is attached to the cover in the usual manner. A ring C, the cross-section of which corresponds to the cross-section of the depression $b$, is made to fit removably into the perforated depression $b$, so as to close the perforations of the same when in position thereon, and is provided with knobs $f$ for conveniently removing the same. When the liquid in the vessel is raised to the boiling-point, it will pass through the openings in the bottom of the depression of the cover and lift up the ring, so that the same will rise, but soon drop back into the depression, the ring C acting thereby in the nature of a valve, so as to reduce the pressure in the vessel, but prevent the exit of the liquid from the same. By the lower temperature of the surrounding air the liquid rising through the holes of the cover is cooled, and thereby the further rising of the same interrupted, it being gradually returned through the perforations in the depression into the body of the vessel. By the rising of the liquid and the return of the same by the perforated depression of the cover in connection with the ring the boiling or bubbling over of the liquid and the annoyance caused by the same are entirely prevented, while still all the advantages of cooking in a practically closed vessel are obtained.

Our improved cover is of special advantage when boiling milk, as it breaks the rising of the milk when the same passes through the perforations of the cover and prevents the disagreeable smell due to the running over of the milk. The boiling over of many liquids similar to milk is ofttimes prevented by touching the bubbling and rising upper surface of the same. Such liquids boiled in vessels provided with our improved cover may be more thoroughly boiled, inasmuch as the rising of the bubbling upper surface of the liquid is continuously interrupted by contact with the depression of the cover.

Having thus described our invention, we claim as new and desire to secure by Letters Patent—

1. The combination, with a cover for vessels provided with an annular depression having perforations in its bottom, of a ring corresponding in shape with said depression and fitting into the same, substantially as set forth.

2. The combination, with a cover for vessels provided with an annular concentric depression having perforations in its bottom or lower portion, of a ring the cross-section of which corresponds to that of the depression and removably fitting in said depression, substantially as set forth.

3. The combination, with a cover for vessels provided with a depression concentric to the rim of the cover and having perforations, of annular means in said depression normally closing the perforations and removably supported on said cover, substantially as set forth.

In testimony that we claim the foregoing as our invention we have signed our names in the presence of two subscribing witnesses.

OTTO KAMPFE.
FREDERICK KAMPFE.

Witnesses:
PAUL GOEPEL,
C. P. GOEPEL.